(No Model.)
10 Sheets—Sheet 4.
L. M. R. DAUDETEAU.
MAGAZINE GUN.
No. 458,824.  Patented Sept. 1, 1891.
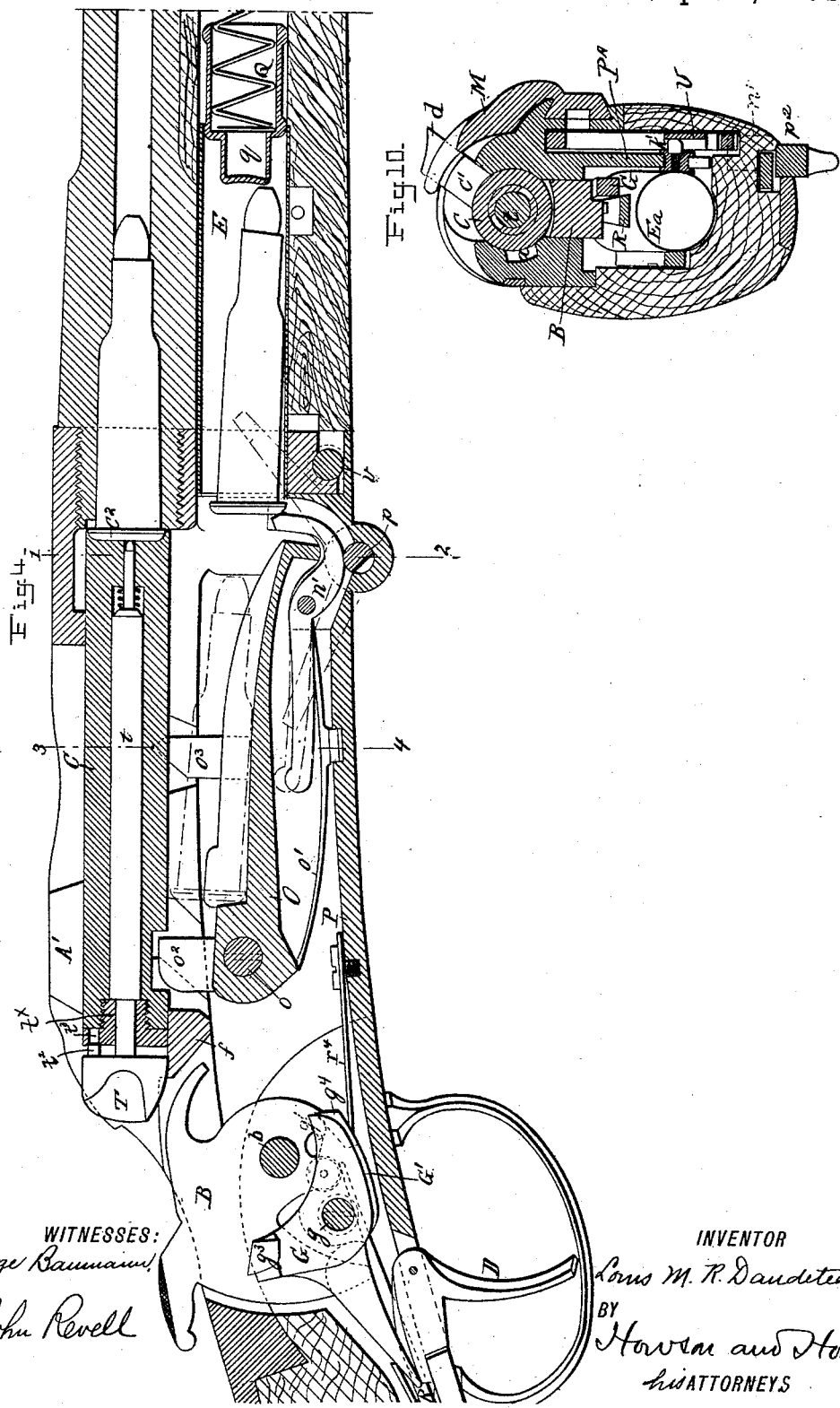
WITNESSES:
George Baumann
John Revell
INVENTOR
Louis M. R. Daudeteau
BY Howson and Howson
his ATTORNEYS

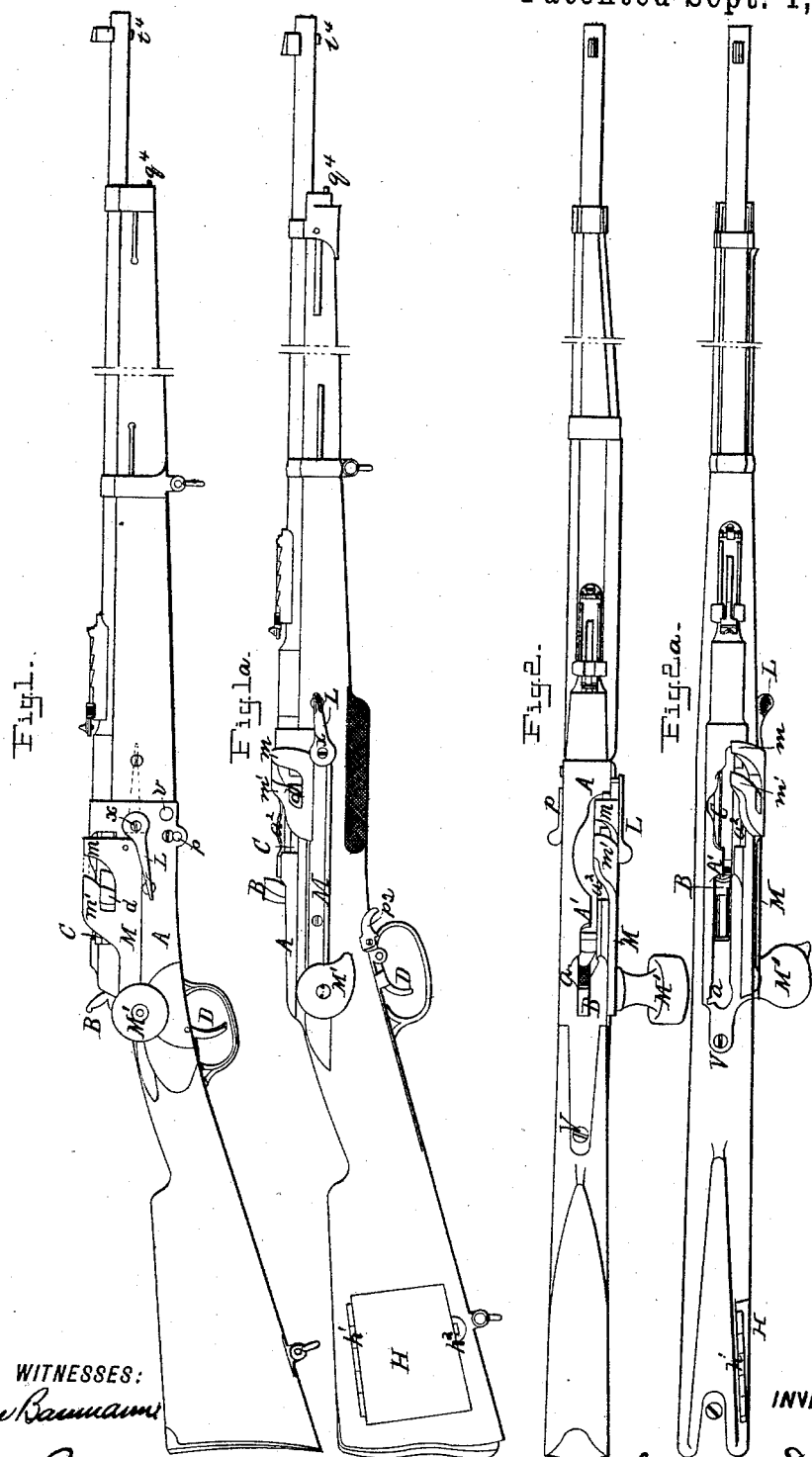

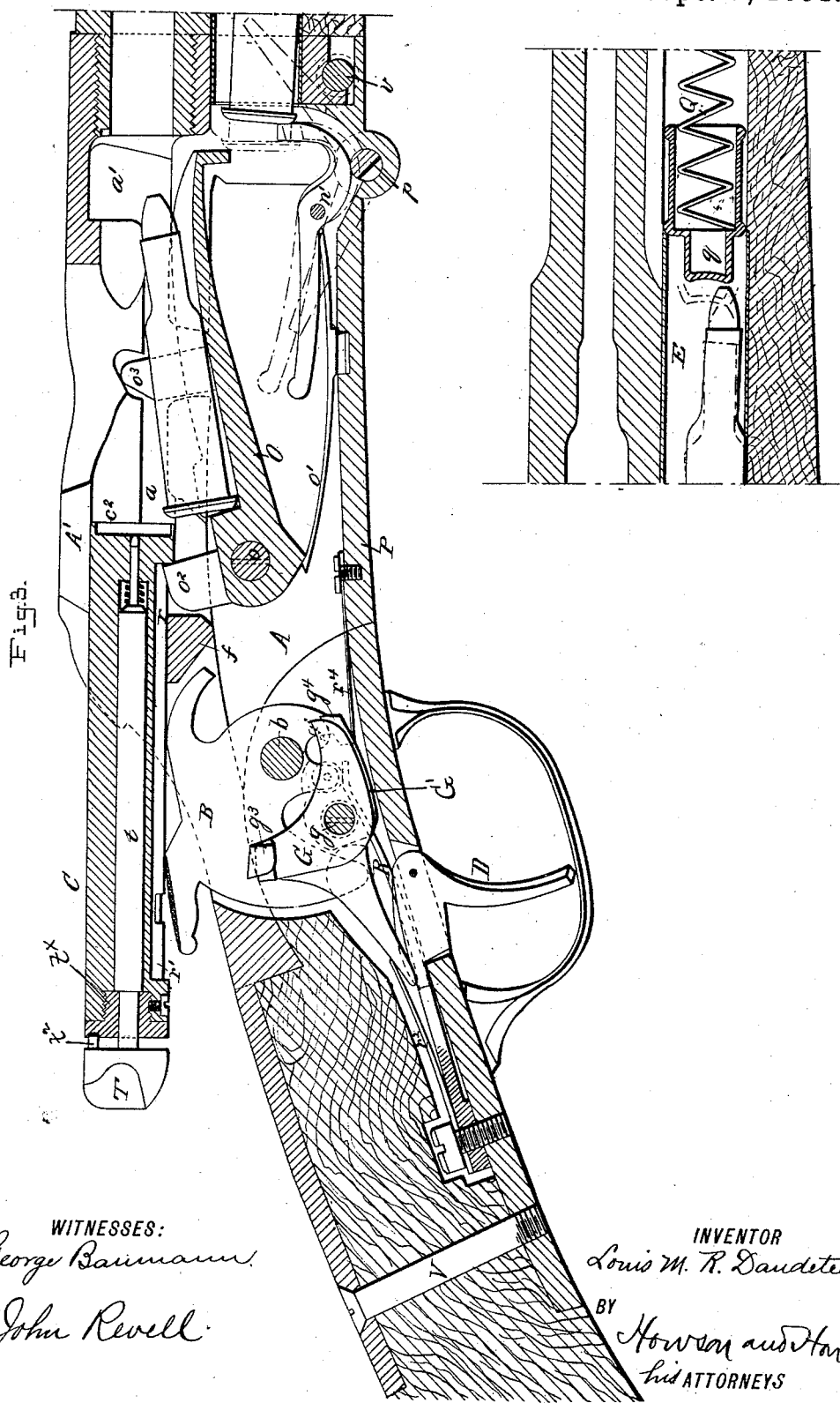

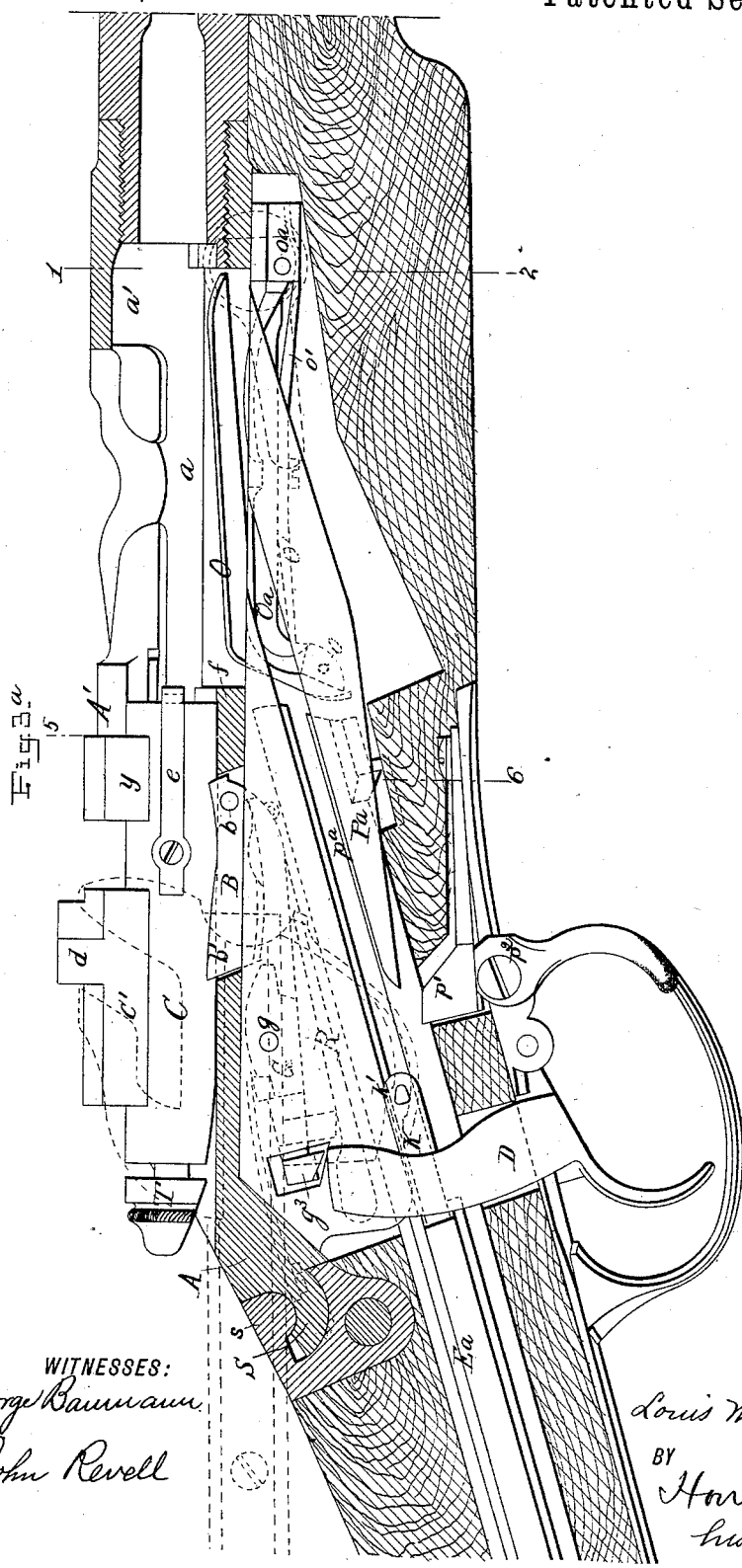

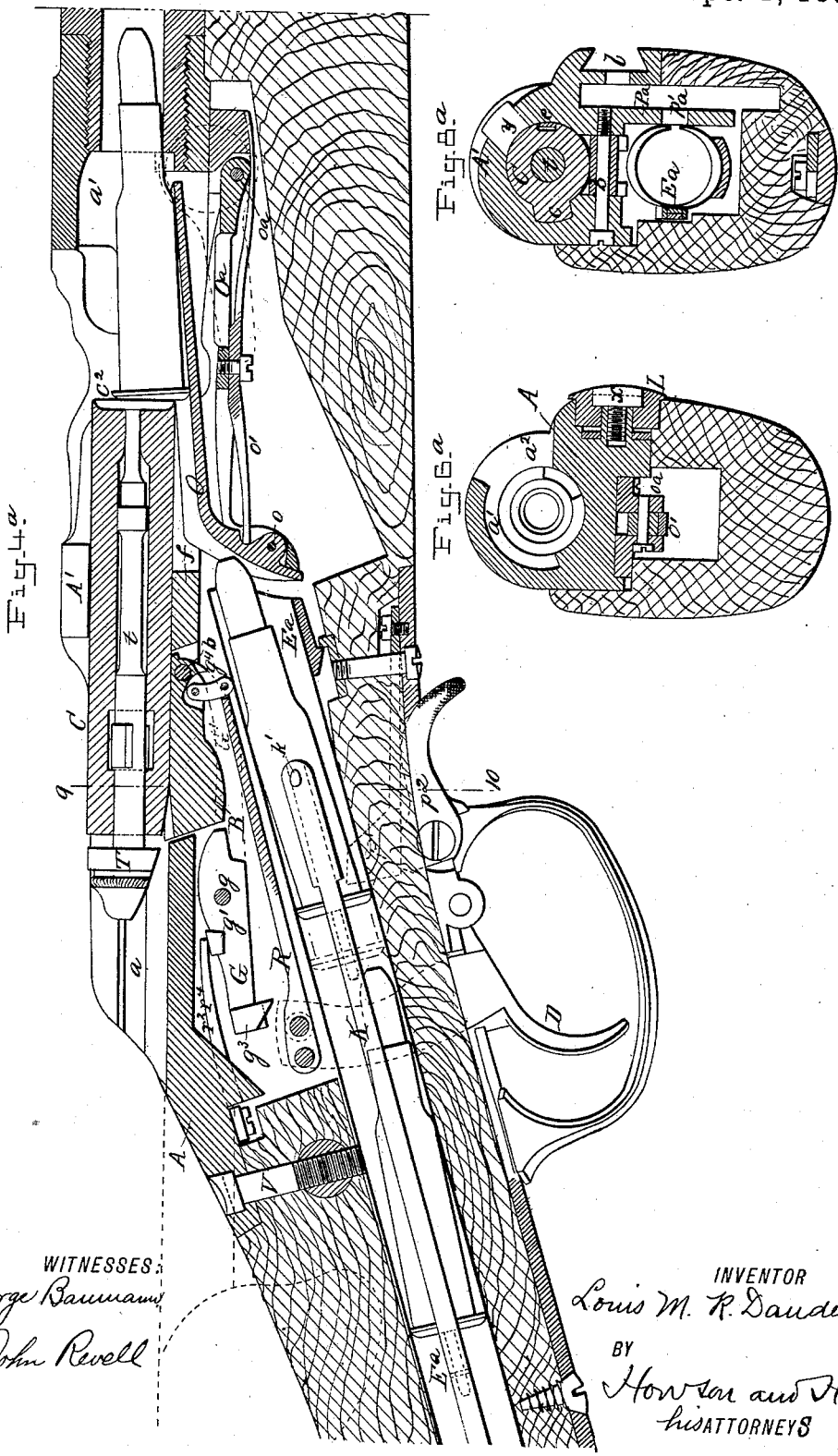

(No Model.)  
10 Sheets—Sheet 6.
L. M. R. DAUDETEAU.
MAGAZINE GUN.
No. 458,824. Patented Sept. 1, 1891.
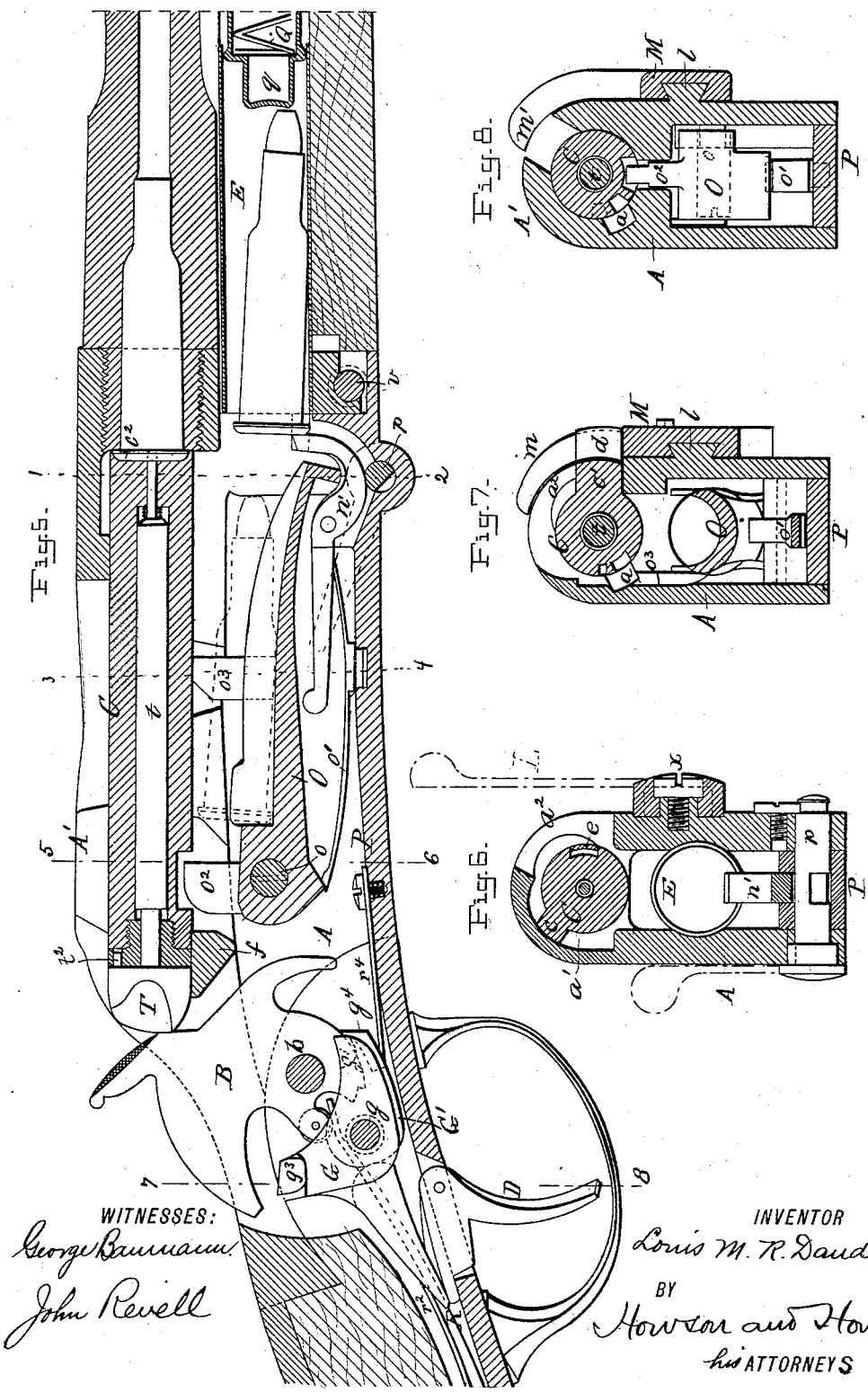

(No Model.) 10 Sheets—Sheet 7.
L. M. R. DAUDETEAU.
MAGAZINE GUN.
No. 458,824. Patented Sept. 1, 1891.
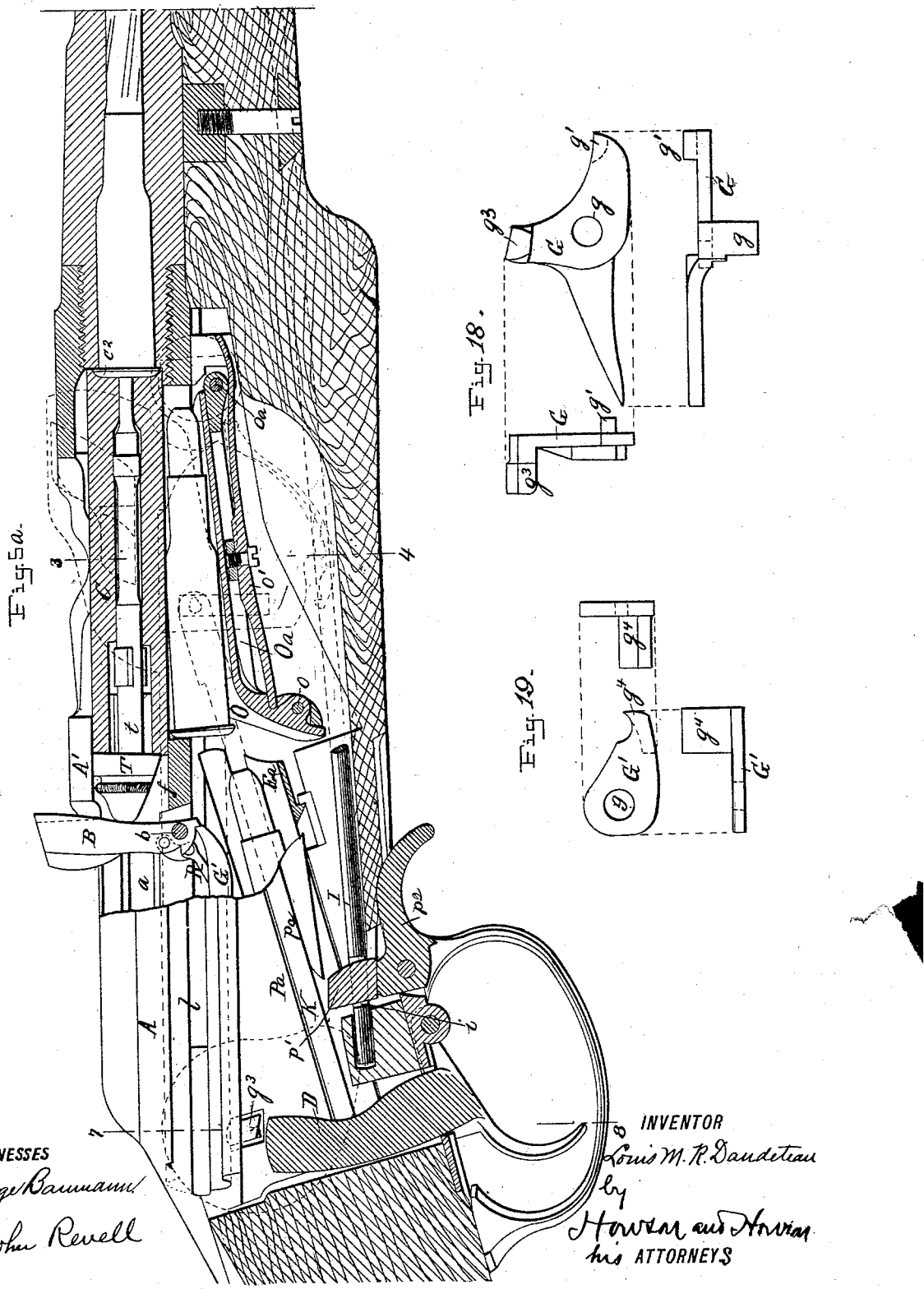
WITNESSES
George Baumann
John Revell
INVENTOR
Louis M. R. Daudeteau
by
Howson and Howson
his ATTORNEYS (No Model.) 10 Sheets—Sheet 8.
L. M. R. DAUDETEAU.
MAGAZINE GUN.
No. 458,824. Patented Sept. 1, 1891.
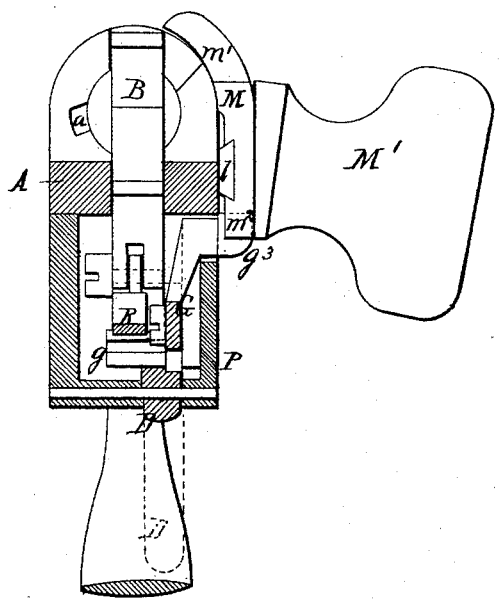
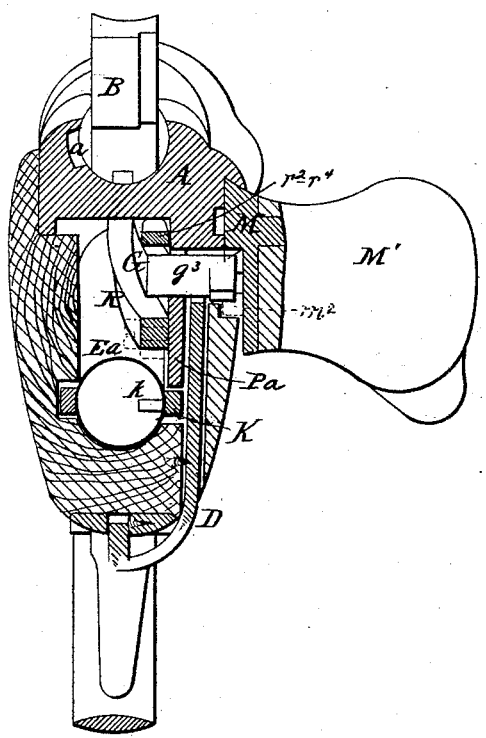
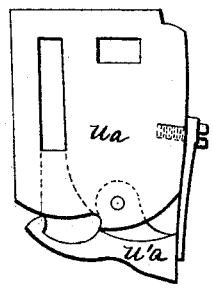
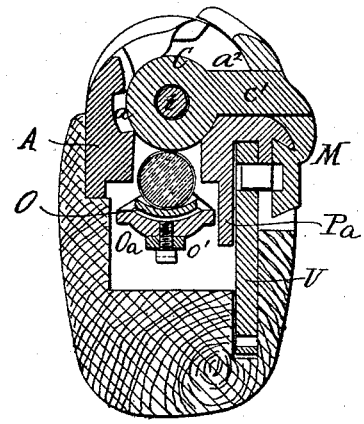
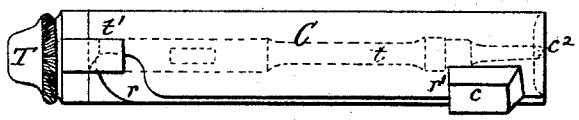
WITNESSES:
George Baumann
John Revell
INVENTOR
Louis M. R. Daudeteau
BY
Howson and Howson
his ATTORNEYS (No Model.) L. M. R. DAUDETEAU. 10 Sheets—Sheet 9.
MAGAZINE GUN.
No. 458,824. Patented Sept. 1, 1891.
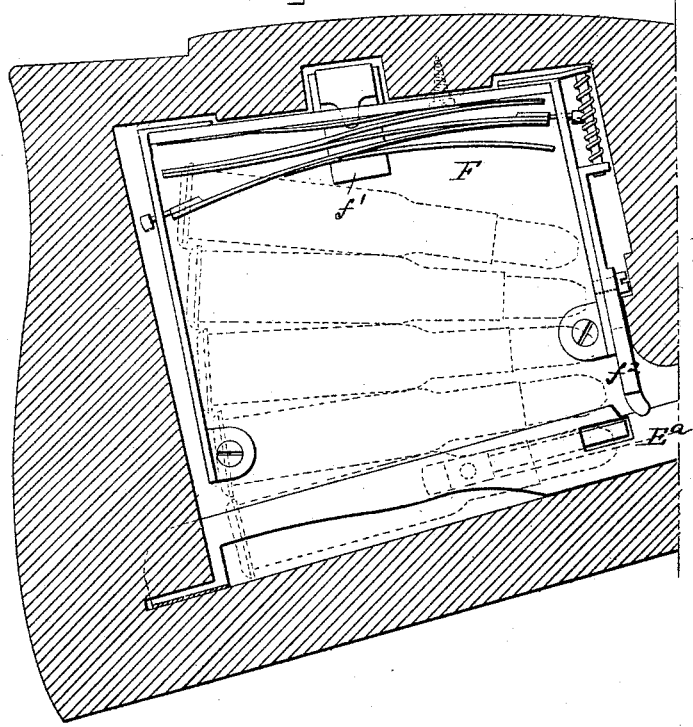
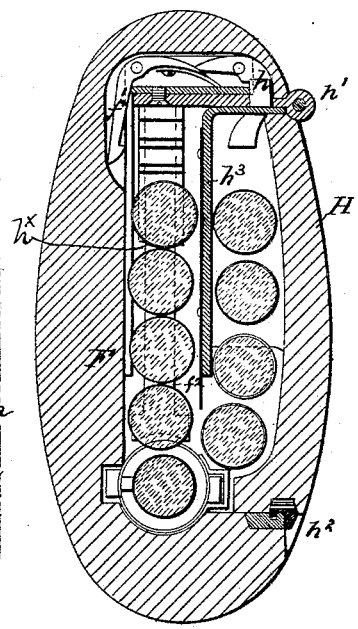
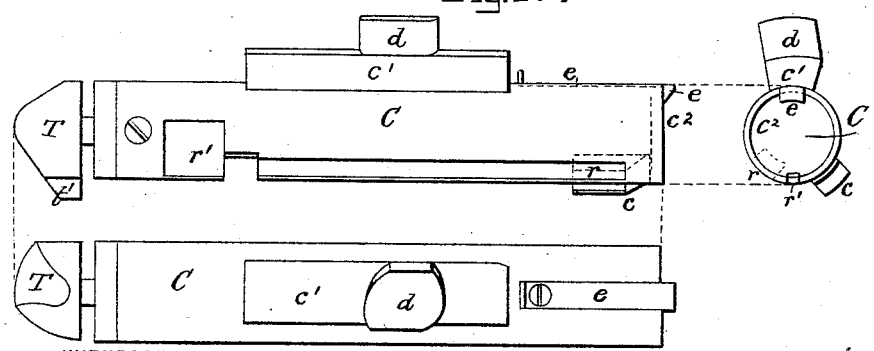
WITNESSES:
George Baumann
John Revell
INVENTOR
Louis M. R. Daudeteau
BY
Howson and Howson
his ATTORNEYS

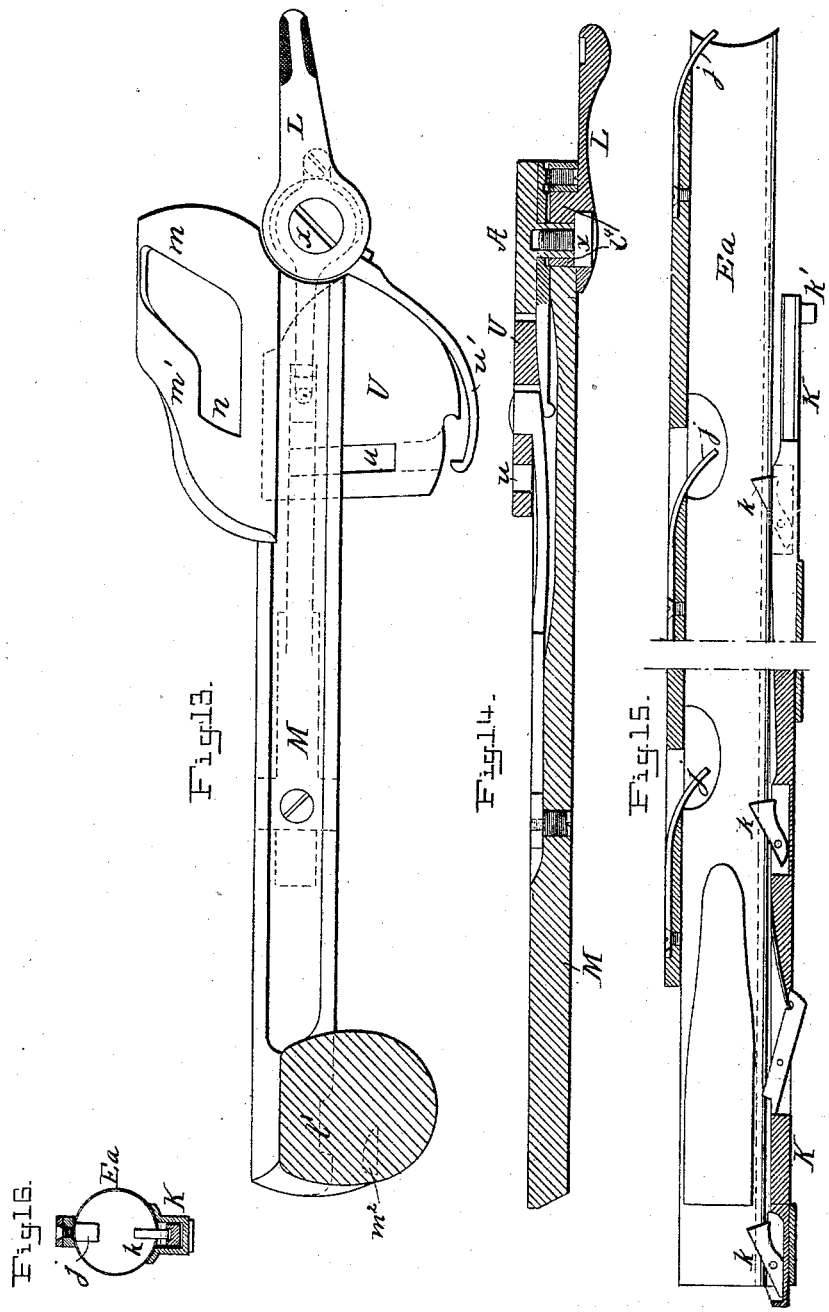

UNITED STATES PATENT OFFICE.

LOUIS MARIE RENÉ DAUDETEAU, OF VANNES, FRANCE.

MAGAZINE-GUN.

SPECIFICATION forming part of Letters Patent No. 458,824, dated September 1, 1891.

Application filed October 12, 1888. Serial No. 287,972. (No model.) Patented in France July 30, 1888, No. 192,109; in Belgium July 31, 1888, No. 82,748; in England August 7, 1888, No. 11,421; in Austria-Hungary November 25, 1888, No. 32,414, and in Switzerland June 25, 1889, Nos. 1,232/1,392.

*To all whom it may concern:*

Be it known that I, LOUIS MARIE RENÉ DAUDETEAU, of Vannes, (Morbihan,) in the Republic of France, have invented Improvements in Fire-Arms, (for which I have obtained Letters Patent in France July 30, 1888, No. 192,109; in Belgium July 31, 1888, No. 82,748; in Austria-Hungary November 25, 1888, No. 32,414; in England August 7, 1888, No. 11,421; and in Switzerland June 25, 1889, Nos. 1,232/1,392,) of which the following is a specification.

In fire-arms constructed according to this invention the cartridge-magazine may be arranged in the butt or under the barrel, or there may be a magazine in the butt combined with a magazine under the barrel, and the repeating mechanism can be thrown out of action so as to enable the fire-arm to be used as an ordinary breech-loader. Means are also provided according to this invention for accelerating the firing.

An important feature of this invention consists in the manner in which the breech is closed by means of an operating device, hereinafter described, which is placed at the right-hand side of the weapon and is easily operated for the purposes of charging and firing. This device has a rectilinear reciprocating motion for opening and closing the breech, and serves also for extra-rapid firing by adapting it to act upon the sear without requiring the rifleman to press upon the trigger, which may nevertheless be used for firing single shots or when using the weapon as an ordinary repeating-rifle. These manifold functions of the said operating device necessitate the employment of two special levers—viz., one for adjusting the rifle for the ordinary repeating action and the other for extra-rapid firing, as hereinafter explained.

Fire-arms constructed according to this invention are also distinguished by the simplicity of the parts, their strength or solidity and their small number, by the perfect and accurate closing of the breech, by the arrangement of the trigger and sear, by the manner in which the magazine mechanism is arranged, by its small weight, its convenient shape, and other advantages of construction hereinafter set forth.

In the accompanying drawings, Figures 1 and 2 represent, respectively, a side elevation and a plan of the improved repeating-rifle with the magazine under the barrel. Figs. 1$^a$ and 2$^a$ are similar views representing the improved repeating-rifle with the magazine in the butt. Figs. 3, 4, and 5 are longitudinal sections of the breech of the type of fire-arm in which the magazine is under the barrel, showing the breech open, the breech closed before firing, and the breech closed after firing, respectively. Figs. 3$^a$, 4$^a$, and 5$^a$ show similar views, on a like scale, of the type of fire-arm with the magazine in the butt, with the exception that Fig. 4$^a$ shows the position of the parts when the breech is about to be closed. Figs. 6, 7, 8, and 9 are transverse sections on the lines 1 2, 3 4, 5 6, and 7 8, respectively, in Figs. 4 and 5. Figs. 6$^a$, 7$^a$, 8$^a$, 9$^a$, and 10 are likewise transverse sections on the lines 1 2, 3 4, 5 6, 7 8, and 9 10, respectively, of the construction shown in Figs. 3$^a$, 4$^a$, and 5$^a$. Figs. 11 and 12 are longitudinal and transverse sections, respectively, of the stock of the type of fire-arm with the magazine in the butt. Figs. 13 and 14 represent in elevation and longitudinal section, respectively, the operating device of the rifle with the magazine in the butt. Figs. 15 and 16 show in detail the tube and the rod with hooks of the type with the magazine in the butt. Figs. 17 to 19 show some detached parts or details, Figs. 17 and 17$^a$ representing the breech-bolt, and Figs. 18 and 19 part of the trigger mechanism.

Those parts that are common to the two types are described once only, and like parts are indicated by like letters of reference. For the sake of greater simplicity the parts are separately described, with the indication of slight differences which may exist for each of the types. Their operation is set forth for firing single shots, for "repeat" firing, and for extra quick firing.

The receiver A consists of a solid piece of steel perforated with a cylindrical hole, and at the left side of the hole with a groove $a$, Figs. 2, 7, and 9, for the reception of the wing or projection $c$ of the breech-bolt C, and near the mouth of the chamber with a recess $a'$, Figs. 3 and 6, in which this wing $c$ is supported at the moment of closing the breech. On the right-hand side is a recess $a^2$, Figs. 2, 6, and 7, for receiving the shoulder $c'$, Figs. 10 and 17 of the breech-bolt in such a manner that the latter is equally supported at the right side and the left. The receiver has at its lower part two mortises, the one in front for the motion of the trough or cartridge-carrier O, which raises the cartridge supplied by the magazine, while the other mortise at the back is for the movement of the hammer B. These two mortises are separated by the pieces $f$, Figs. 3, 4, and 5. The top of the receiver is provided with an opening at the right side at an angle of forty-five degrees, Fig. 8, to allow the movement of the shoulder $c'$, and an extension A' at the left side covers the breech-bolt, so that the latter may not be raised when the hammer is being cocked. In front of the extension A' there is an open space for the escape of gases which may obtain access to the mechanism on the accidental bursting of a cartridge-case. At the outside on the right-hand side of the receiver there is a dovetailed or undercut groove $l$ or a tongue for receiving the hereinafter-described operating device M and guiding it in its to-and-fro or sliding movement. Under this groove (or tongue) an opening is provided, through which projects an arm $g^3$ on the sear G, the use of which will be hereinafter set forth.

In a fire-arm with the magazine in the butt the lower part of the receiver comprises an arm or plate P$^a$, with a diagonal groove $p^a$ for receiving the head of a rod K with hooks, hereinafter described, Figs. 3$^a$ and 10. This groove, instead of being on the breech-box, may be on the tube of the stock. The plate P$^a$ also carries at the inner side the entire trigger mechanism. The receiver is fixed to the stock of the weapon by a screw V, Fig. 4$^a$, which engages with the tail of the receiver and screws into a transverse screw previously inserted into the stock. To prevent all rearward vibration, a supplementary heel or projection S may be provided, and in this case the screw V may be dispensed with and the breech-bolt be attached to the stock by simply turning down the barrel by means of a hook $s$, Fig. 3$^a$.

In the rifle with the magazine under the barrel the receiver is provided underneath with a plate P, upon which are mounted the trigger mechanism and the "repeating-lever" $p$. The receiver and trigger-guard plate are united by the screw V screwing into the plate, and by a transverse pin $v$. (See Fig. 3.) By this means it becomes easy to take the weapon to pieces, and the same may be very rapidly examined. It may be observed that in this weapon the stock is made in two pieces, the fore-end in one piece and the butt in another. The receiver, entirely of metal, may be surrounded by a closely-fitting covering which leaves only that opening uncovered by which the cartridges are ejected and by which the magazine is charged.

The movable breech-bolt consists (Figs. 3 and 17) of a cylinder C, made of steel, provided with a shoulder $c'$ and a wing $c$, which serves to support it against the recoil of an extractor $e$ and a longitudinal slot $r\,r'$, situated approximately on a line with the projection $c$. On the shoulder $c'$ there is a manipulating stud or handle $d$, of cylindrical or other suitable shape, which handle serves (as will presently be seen) to turn the breech-bolt and also to open or close the breech. The breech-bolt is pierced by a central cylindrical hole containing a firing-pin $t$, having a head T, which in turn carries a spur $t'$ and a curved plane or incline $t^2$, which engages with a corresponding and oppositely-curved plane or incline $t^3$ on the breech-bolt when the bolt is entirely closed, Figs. 3, 4, 5, and 17. The spur $t'$, Figs. 17 and 17$^a$, works in the groove $a$ of the receiver, and the firing-pin consequently cannot partake of the rotary movements of the breech-bolt. The firing-pin may be retained in the breech-bolt by a threaded stuffing-box $t^\times$, as shown in Figs. 3, 4, and 5, or by any other suitable means. The firing-pin is free in the recess provided for it, or it may be subject to the action of a light spring, and its relatively small point projects at the center of the hollow $c^2$, formed at the end of the breech-bolt.

The operating device or slide M is placed at the right-hand side of the weapon, Figs. 1, 2, 7, 8, 9, 13, and 14, and is mounted so as to be free to slide upon a dovetailed tongue or in the groove $l$ in the receiver. This device is provided with a handle M', which is grasped by the right hand for operating it, and is provided with helicoidal inclines $m$ and $m'$, which may or may not be connected at their ends and between which engages the stud $d$ on the breech-bolt. These inclines slightly overlap. The helicoidal incline $m'$ terminates in a notch $n$, Fig. 13, which admits of a further movement of the lever or slide M, so that the latter may by its spur $m^2$ act upon the arm $g^3$ of the sear G, which projects through the mortise of the receiver. The manipulating-handle M' may, instead of projecting at the right side of the weapon, project at its left, and to this end it need only be turned over in making it encircle the shaft above or below the receiver.

The trigger mechanism, Figs. 3, 4, 5, 9, 18, and 19, consists of a hammer B, a sear G, and a counter-sear or tumbler G' with a movable nose. The hammer B has its pivot-pin $b$ placed as low as practicable, so as to increase the force of the blow, while facilitating the cocking by the passage of the breech-bolt upon the hammer. It is shaped to the outline shown in the above-mentioned figures of the drawings, and its spring R acts on a roller or by any other convenient means. This hammer has a face which strikes the head of the firing-pin, and a notch with which the nose of the sear engages. The sear G is formed by a piece mounted on the pivot $g$ and brought into position by the counter-spring $r^2$. The trigger D, placed under a guard of the usual construction, acts upon the rear portion of the sear. This sear carries an arm $g^3$, passing through the mortise of the receiver, and against which abuts the spur $m^2$ of the manipulating-lever when the latter makes its supplementary movement.

Referring to Figs. 2, 3, 4, 18, and 19, also to Figs. 9 and 10, the tumbler or counter-sear G' is mounted on the pivot of the sear and carries the nose-piece $g^4$, engaging with the boss of the hammer. At full-cock it participates in every movement which tends to lower the front portion of the sear by reason of the stud $g'$, which is placed on the front part of the tumbler and overlaps the front part of the tumbler; but, on the other hand, it may be lowered by itself without communicating motion to the sear, of which it is to that extent independent. It is therefore easy to understand what occurs when the hammer B is placed at "full-cock." Its boss lowers the movable nose-piece $g^4$ alone until the latter becomes engaged, while the sear G and its arm $g^3$ do not move, being retained by the support they obtain from the operating-lever or in any other manner.

Referring to Figs. 2ª, 3ª, 4ª, and 9ª, it will be seen that the hammer, sear, and tumbler are of different outline or shape; but the foregoing description relating to the trigger mechanism of the gun having the magazine under the barrel suffices equally to describe the trigger mechanism of the gun having the magazine in the butt and shown in the above-mentioned figures, with the exception that the stud $g'$ in this latter case is placed behind the pivot $g$, and must therefore be placed upon the tumbler to cause the nose-piece $g^4$ to be lowered when the front of the sear is lowered.

While the operating-bar M or other similar piece is in contact with the arm $g^3$ it is impossible to release the hammer by means of the trigger D or by the said arm $g^3$, as the hammer is held by the nose-piece $g^4$ on the tumbler. At the moment when this contact ceases it becomes possible (by reason of a notch $l'$, provided on the bar M, Fig. 13) to rock the sear by acting upon the trigger D, and consequently to actuate the nose of the movable tumbler G' and to disengage the striker. This movement being made coincident with the complete closing of the movable breech-piece, it is thus insured that the arm shall not be prematurely discharged.

The cartridge-magazine is placed either under the barrel or in the butt of the rifle, or both. When under the barrel, Fig. 3, it consists of a cylindrical tube or chamber in the stock, lined, if desired, with a metal tube E, either throughout its entire length or upon part of the same. The cartridges are introduced into the magazine through the breech, when open, or through the fore end, which in this case has a screw-stopper or any other means for closing it. The magazine arranged in the butt, Fig. 3ª, consists of a metal tube Eª, beginning below the breech and opening into the hollow butt, so as to form a chamber F, Figs. 11 and 12, closed by a lid H at the right-hand side of the weapon. This chamber is provided with a spring formed of steel plates, the ends of which slide in grooves $h^\times$, Fig. 12, which guide and limit their motion. To compress this spring, it is sufficient to seize it with the fingers and to draw it backward toward the point where it is attached, when it engages with a stop $f'$, perpendicular to it. This stop, Fig. 12, is arranged in such a manner that when the lid is closed this latter causes the stop to oscillate through the lever $h$ and to set the spring free, which can then expand. The lid is attached by a hinge at $h'$ and is held closed by the spring-hook $h^2$. It has an open-work metallic partition $h^3$, forming a kind of compartment open at its lower part when the lid is closed. The cartridges are introduced ball foremost through the open chamber into the tube Eª, which is filled. Then others are placed in the chamber F, care being taken to compress the spring of the same, and lastly the chamber of the lid H is filled. The lid being closed, it automatically disengages the spring which presses upon the cartridges in the chamber, forcing them to present themselves successively at the mouth of the tube Eª. The cartridges in the compartment pass out by the lower aperture thereof and of course present themselves to the tube. To avoid simultaneous introduction of two cartridges into the tube Eª, (which might occur, owing to the inclined position of the cartridges, Fig. 11,) a small spring-flap $f^2$ is provided at the mouth of the tube. This spring flap or shutter rises and falls automatically each time a cartridge is drawn out.

*Propelling mechanism.*—In a fire-arm having the magazine under the barrel the propelling mechanism consists simply of a coiled spring Q, bearing against the end of the magazine and acting by expansion upon a follower $q$, which pushes out the cartridges, Fig. 3. The introduction of the latter into the magazine compresses the spring, which is thus put under tension. The last cartridge which is inserted is retained by a spring-catch $n'$, the operation whereof is hereinafter described.

In the rifle having the magazine in the butt the propelling mechanism consists of a plate U, a movable rod K, and retaining-hooks. The thin plate U, Figs. 13 and 14, or Uª, Fig. 13ª, is firmly connected with the operating device M and placed in a narrow channel, Figs. 7ª and 10, between the plate Pª and the stock fittings. It is provided with a notch $u$, the opening of which is placed in line with a hooked spring $u'$, Fig. 13, or of a pivoted spring-hook $u'^{a}$, Fig. 13ª, mounted on the said piece U$^a$. In the first case the opening is normally open. In the second case it is closed. As the handle M is pulled back to open the breech, a stud $k'$ on the forward end of the rod K passes between the spring $u'$ (or $u'^a$) and the plate U, (or U$^a$,) as shown in dotted lines in Fig. 3$^a$.

When it is desired to use the gun as an automatic loader, a repeating-lever $p^2$ is placed in such a position, as hereinafter explained, that when the handle M is pushed forward to close the breech the spring $u'$ is prevented from yielding and the stud $k'$ is carried forward, passing up in the notch $u$ as it rises. (See Fig. 5$^a$.) When the gun is used as an ordinary loader, the repeating-lever is placed so as to allow the spring $u'$ to yield, and the stud $k'$ remains stationary when the breech is closed. The rod K is made of steel, Figs. 15 and 16, and moves in a channel which is at the side of the tube E$^a$, from the butt to beneath the breech-box. It is provided with hooks $k$, which are preferably spring-hooks, as shown, and is fitted with a stud $k'$, Figs. 4$^a$ and 10, which, when the hammer is cocked, projects through the oblique slot in the plate P$^a$. When the stud is engaged with the ring, the rod becomes, as it were, one piece with this part, so that the operating-lever imparts to it a reciprocating movement. In this movement the rod K propels the cartridges placed in the tube and causes the same to advance from one place to another until they have all been brought successively under the movable breech-bolt, where the elevator O raises them and places them in a line with the chamber of the barrel. This rod K slides at each end in a guide, insuring its regular working. The retaining-hooks $j$ are situated upon the other side of the tube a little behind those of the rod K. They are formed of flexible plates fixed upon the tube E$^a$ and projecting into the interior of the latter through openings in the walls or sides. These hooks $j$ serve to retain the cartridges brought forward by the rod K, which in returning is thus prevented from carrying the cartridges back with it. Following the cartridges contained in the tube come those placed in the chamber in the butt and in its lid, which are seized one by one by the last hook of the rod.

In a fire-arm having the magazine under the barrel the rod with hooks may be used as a propelling device in substitution for the coiled spring. In this case the cartridges are introduced at the end of the magazine and brought upon the elevator-trough by the flange with the cap to the rear. The cartridge-elevator serves as an intermediary between the magazine, wherever the same may be provided, and the breech-chamber of the barrel. It consists of a lever-arm O, hollowed out on its upper side and hinged at $o$ under the movable breech-bolt, and a counter-spring $o'$ tends constantly to raise it. According to whether the arm is provided with a magazine under the barrel or in the butt the arrangement of the said trough will be varied. In the first case the elevator is provided with two tappets $o^2$ and $o^3$, which act in conjunction with the groove $r$ $r'$ and the projection $c$ on the breech-bolt, respectively, the function of one $o^2$, coming against the end $r$ of the groove $r$ $r'$, being to raise the elevator when the breech is being opened, and of the other $o^3$, being engaged by the projection $c$, to depress it when the breech is closed. In the second case the elevator is mounted on a frame O$^a$, swinging on $o^a$ in front of the receiver and moving therewith, Fig. 5$^a$, to allow the passage of the cartridge fed forward by the propelling mechanism. When the breech is opened, the trough and its frame rise, Fig. 4$^a$, by means of the counter-spring $o$ and present the cartridge to the breech-bolt, which pushes it into the breech-chamber.

By means of the repeating-lever the operation of the mechanism for propelling the cartridges contained in the magazine may be either suspended or re-established. In a fire-arm having its magazine under the barrel this lever or key is in the form of a cam $p$, arranged transversely under a stop-pawl $n'$, and is turned by means of a small lever provided either at the right-hand side or at the left of the stock-fittings. When this cam presents its longest radius to the pawl or catch $n'$, the latter cannot descend and the cartridges are retained in the tube E. When, on the other hand, the cam presents its shortest radius, the pawl is depressed (see the dotted lines, Fig. 3) by the movement of the elevator when the breech is being closed, and one cartridge is enabled to pass.

In a fire-arm having the magazine in the butt the repeating key or lever or cam $p^2$ acts on a spring-tappet $p'$, which it causes to move from the position shown in Fig. 3$^a$ to that shown in Fig. 4$^a$. In its former position this pawl has no effect upon the hooked spring $u'$ or upon the pivoted spring-hook $u'^a$ of the ring U or U$^a$ when the latter is pulled back. In the second position it presses upon the hooked spring or upon the heel of the pivoted spring-hook. In this manner it allows the ring to engage with or release the rod K of the propelling mechanism.

Independently of the means provided for adapting the rifle for firing single shots and for making it a repeating-rifle by means of the lever $p$, just described, a still more rapid fire may be obtained by dispensing with the action of the finger upon the trigger and substituting therefor a longer movement of the operating-lever M. As this lever is pushed forward, it is stopped when the breech is closed by a key or lever L, called the "quick-fire lever," provided upon the right-hand side of the weapon in front of the operating-lever M. This lever L is pivoted at the point $x$ to the receiver A, Figs. 1, 6, 13, and 14. The part $l^4$ of the lever L, with which the lever M comes in contact, is made eccentric to the pivot $x$, or, as shown in Fig. 14 and in dotted lines in Fig. 3ª, a portion of the part l' is cut away, thus forming a cam, so that when the lever L is turned to present the cut-away portion to the lever M this lever M is allowed an additional movement beyond the closing of the breech to the extent of a few millimeters. This extra motion is sufficient to allow the spur $m^2$ to meet the arm $g^3$ of the sear, causing it to release the hammer, as hereinabove described. This lever is retained in either of its positions shown in the drawings by small projecting studs, with which it engages. A fire-arm thus constructed is adapted for firing single shots, for repeating, and for extra-rapid firing. Its operation in each of these cases is next described.

To use the arm as an ordinary breech-loader, the pin or lever $p$ in the rifle having the magazine under the barrel is placed in the position shown in Fig. 3, which has the effect of rendering the pawl $n'$ immovable, thus preventing the cartridges in the magazine from passing to the elevator. In the rifle which has the magazine in the butt the lever $p^2$ (see Fig. 3ª) is placed in such a position that the tappet $p'$ will not press upon the spring of the ring U, which ring will therefore move forward without operating the movable rod K, which feeds the cartridges forward. The key L in either fire-arm is also so placed that the operating-lever is limited to its shorter movement, and the rifleman is compelled to use the trigger for firing, this being the normal position of the said lever. These precautions being taken, the rifleman grasps the handle M' and draws it back, which opens the breech by pulling the breech-bolt C by means of the stud $d$, engaged between the inclines $m$ $m'$ of the lever M. He then places a cartridge in the chamber and pushes the handle M' forward, so as to effect the closing. Lastly, he fires by acting upon the trigger D, draws the handle backward for ejecting the cartridge-case, puts in a fresh cartridge, and repeats the operations.

In order to use the repeating action in the type with the magazine under the barrel, the lever $p$ is thrown back, so that the flat side of the cam is presented to the lever $n'$, allowing this lever $n'$ to fall below the cartridge-opening in the barrel and allow the cartridge to be pushed out by the spring Q.

In the type of gun having the magazine in the butt the lever $p'$ is placed in the position shown in Figs. 4ª and 5ª by means of the cam $p^2$. Then as the slide M is moved forward the lever $p'$ presses upon the spring-hook $u'$, causing the ring U to retain the head $k'$ of the rod K. A fresh cartridge is then brought forward at each closing of the fire-arm. In each of these cases the gun is automatically fed with cartridges and the rifleman uses the trigger to fire.

For extra-rapid firing the lever L is moved forward into a horizontal position, so as to allow the operating device M to make an additional movement of five millimeters and to cause its spur $m^2$ to act upon the arm $g^3$ of the sear, so as to set free the hammer B, which automatically strikes the head of the firing-pin. This method of firing may be employed for single shots and with the repeating action. The movement of closing the breech discharges the fire-arm.

The security presented by this rifle while firing is twofold: First, the firing-pin $t$ cannot act upon the cartridge until the breech is closed, because the inclined surface of the head T of the firing-pin cannot engage with the corresponding inclined surface of the breech-bolt C, except when the latter is completely closed; second, the trigger mechanism cannot be acted upon except while the arm $g^3$ of the sear is in line with the recess $l'$, provided upon the stem of the operating-lever, and this recess presents itself to the arm $g^3$ only when the cylinder is completely closed.

I claim as my invention—

1. In a breech-loading fire-arm, a movable breech-bolt carrying the firing-pin and provided with a projection $c$ and also with a stud $d$, in combination with a receiver having a groove $a$ and recess $a'$ for the reception and guidance of the projection $c$, and an upper oblique slot $a^2$ for the passage of the stud $d$, and an operating-slide provided with inclined surfaces $m$ $m'$ to act on the stud $d$ of the bolt, all substantially as described.

2. In a breech-loading fire-arm, the combination of the receiver and movable breech-bolt therein having a firing-pin with a hammer and the sear therefor and an operating-slide engaging with the breech-bolt and with the sear and provided with the notch $l'$, into which a part of the sear may enter, all substantially as and for the purposes set forth.

3. In a breech-loading fire-arm, the combination of the receiver and a movable breech-bolt therein with an operating-slide engaging the breech-bolt and provided with a projection $m^2$, a firing-pin in the breech-bolt, a hammer therefor, and a sear engaging with the hammer and provided with an arm $g^3$, projecting into the path of the said projection $m^2$, as and for the purpose set forth.

4. In a fire-arm, the combination of a hammer with a sear having a nose-piece, a counter-sear to engage with a notch in the hammer and to be acted upon by the said nose-piece, and a trigger for the sear, all substantially as set forth.

5. In a fire-arm, the combination of a receiver, a movable breech-bolt having a firing-pin, and firing mechanism, substantially as described, with an operating-slide engaging with the firing mechanism, a lever provided with a cam-stop to determine the movement of the slide, and a trigger, all substantially as and for the purposes set forth.

6. In a breech-loading fire-arm, the combination of an operating-slide to open and close the breech and provided with a spring-hook with a feed-rod K for the cartridges, provided with a projection $k'$, and a cam-lever $p'$ to act on the spring-hook to engage or release the projection $k'$ and the spring-hook, substantially as and for the purposes set forth.

7. A breech-loading fire-arm having a magazine-chamber F in its butt provided with a lid H, also having a compartment for cartridges opening into the said chamber F when the lid is closed, and means for conveying the cartridges from the chamber F to the receiver, all substantially as set forth.

8. In a breech-loading fire-arm, the combination of a receiver, a movable breech-bolt therein with a magazine for cartridges, a hooked rod for feeding the cartridges forward, a projection on the said rod, and an operating-slide to open and close the breech and having a ring U, with a spring-hook to engage the projection on the rod, as and for the purposes set forth.

In testimony whereof I have signed my name to this specification in the presence of two subscribing witnesses.

LOUIS MARIE RENÉ DAUDETEAU.

Witnesses:
JEAN BAPTISTE RIVALIER,
JEAN GAUTTIER.